H. C. MONTGOMERY.
Stop-Valves, Cocks, &c.
No. 136,851. Patented March 18, 1873.
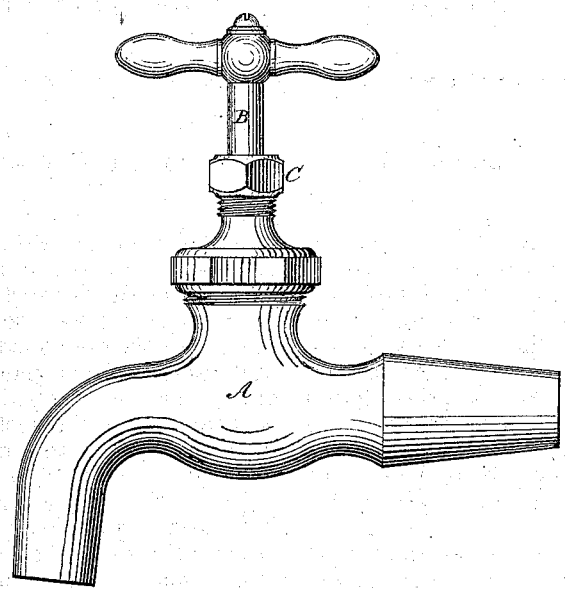
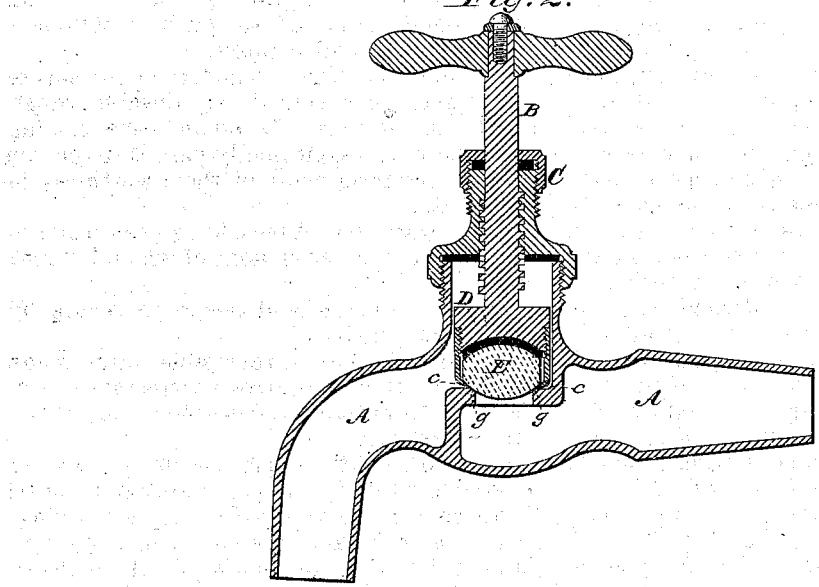
Witnesses:
Edward Smith
A. H. W. Cates
Inventor:
Harry C. Montgomery

UNITED STATES PATENT OFFICE.

HARRY C. MONTGOMERY, OF BOSTON, MASSACHUSETTS.

IMPROVEMENT IN STOP VALVES, COCKS, &c.

Specification forming part of Letters Patent No. 136,851, dated March 18, 1873.

*To all whom it may concern:*

Be it known that I, HARRY C. MONTGOMERY, of Boston, in the county of Suffolk and State of Massachusetts, have invented a new and Improved Valve for Stop Valves, Cocks, Faucets, &c.; and I do declare that the following is a full, clear, and exact description thereof, which will enable others skilled in the art to which my invention appertains to make and use the same, reference being had to the accompanying drawing forming part of this specification.

This invention relates to a new and improved construction of stop valves, cocks, faucets, &c., for steam, liquids, and other purposes, whereby the same is made to operate without corrosion, and the valve will automatically seat itself, and is greatly cheapened and simplified in their construction, application, and operation; and the invention consists in combining a double-convex reversible non-corrosive valve, molded or ground in one piece, made of glass or other non-corrosive substance, with its corresponding concave seat for stop valves, cocks, faucets, &c.; it further consists in the manner of constructing the valve socket or shell wherein the valve is contained, whereby said valve will have lateral motion to allow it to automatically adjust itself to its seat, as will hereinafter be more fully described.

Figure 1 in the drawing represents a side elevation of an ordinary faucet. Fig. 2 is a vertical central longitudinal section of same. Fig. 3 is a detached view of the valve.

A is the body of the cock. B is the stem, with a portion of the socket cast together. C is the gland or stuffing-box. D is the shell or socket, formed in two pieces screwed together. The valve is made smaller than the interior of the socket, for the purpose of allowing lateral motion to the valve within the shell or socket. The lower portion of the socket is provided with a lip or shoulder upon the inner and lower end, as seen at c, Fig. 2, to secure the valve in the shell or socket. The upper portion of the socket is cast solid with the stem. E represents the double-convex reversible valve, preferably made of glass, but it may be made of any non-corrosive substance. The valve E is inserted into the socket, the parts screwed together and put into the body A of the faucet, when it is ready for use.

Should the stem get bent or out of line the valve will adjust itself to its seat, (it being loose in the socket,) thereby avoiding leakage so common in valves and faucets, with positive motion, or when the stem and valve are cast in one piece, and so much so that new ones have to be substituted.

Regrinding is also avoided, the hard nature of the glass rendering it very durable, resisting the fine particles of sand and other cutting substances that continually pass through the valves, rendering many of them worthless in a short time.

I am aware that valves have been made of non-corrosive material, none of which I claim; but What I do claim, and desire to secure by Letters Patent, is—

1. A double-convex reversible valve made of glass or other non-corrosive substance, substance, substantially as described, and for the purpose set forth.

2. In combination with the double-convex reversible valve E, the valve socket or shell D, the concave valve-seat G with the working-parts of an ordinary valve or faucet, substantially as described and shown, for the purpose set forth.

HARRY C. MONTGOMERY.

Witnesses:
 EDWARD SMITH,
 A. G. W. OATES.